United States Patent
Taillie et al.

[11] Patent Number: 5,926,664
[45] Date of Patent: Jul. 20, 1999

[54] CORE MADE OF A SOFT MAGNETIC MATERIAL FOR USE IN AN ELECTROMAGNETIC ACTUATOR

[75] Inventors: Paul L Taillie; Joel Sherwood Lawther, both of Rochester; John K Erickson, Victor, all of N.Y.

[73] Assignee: Eastman Kodak Company, Rochester, N.Y.

[21] Appl. No.: 08/960,546

[22] Filed: Oct. 31, 1997

Related U.S. Application Data

[63] Continuation of application No. 08/616,868, Mar. 15, 1996, abandoned.

[51] Int. Cl.$^6$ .................................................. G03B 9/08
[52] U.S. Cl. ...................... 396/463; 335/237; 335/272; 335/298; 310/49 R
[58] Field of Search .................... 310/49 R, 156; 335/236, 237, 272, 298; 396/463–470, 508

[56] References Cited

U.S. PATENT DOCUMENTS

| | | | |
|---|---|---|---|
| 1,548,596 | 8/1925 | Ghegan | 335/237 |
| 2,504,681 | 4/1950 | Hall | 335/237 |
| 3,456,219 | 7/1969 | Paddison et al. | 335/298 |
| 4,224,589 | 9/1980 | Tamulis | 335/237 |
| 4,288,771 | 9/1981 | Ueda et al. | 335/230 |
| 4,890,129 | 12/1989 | Mody | 354/234.1 |
| 5,097,240 | 3/1992 | Nakanishi et al. | 335/296 |
| 5,418,588 | 5/1995 | Chigira | 354/234.1 |

FOREIGN PATENT DOCUMENTS

| | | | |
|---|---|---|---|
| 373376 | 1/1921 | Germany | 335/236 |
| 543039 | 3/1930 | Germany | 335/236 |
| 970599 | 10/1953 | Germany . | |
| 970599 | 10/1958 | Germany | 335/236 |
| 559863 | 3/1944 | United Kingdom | 335/236 |

*Primary Examiner*—Michael L. Gellner
*Assistant Examiner*—Raymond Barrera
*Attorney, Agent, or Firm*—Gordon M. Stewart

[57] ABSTRACT

An electromagnetic actuator includes a core made of a soft magnetic material, a permanent magnet located between a pair of ends of the core, the permanent magnet being supported for movement, and an electrically conductive coil wrapped about a portion of the core. The reluctance of the core is adjustable to alter movement of the permanent magnet as a function of time upon application of electrical current to the coil of the electromagnetic actuator.

13 Claims, 6 Drawing Sheets

CORE MADE OF A SOFT MAGNETIC MATERIAL FOR USE IN AN ELECTROMAGNETIC ACTUATOR

This is a Continuation of application Ser. No. 08/616,868, filed Mar. 15, 1996, now abandoned.

FIELD OF THE INVENTION

The invention relates generally to the field of actuators, and in particular to electromagnetic actuators. More specifically, the invention relates to a core made of a soft magnetic material for use in an electromagnetic actuator, the reluctance of the core being adjustable.

BACKGROUND OF THE INVENTION

As shown in FIG. 1, an electromagnetic actuator 8 is commonly used to move a shutter 11 to control film exposure in a camera. A camera aperture 10 is normally covered with one or more shutter blades 11 to prevent film exposure to scene light. In one form of an electromagnetic actuator, shutter blade 11 is attached to a cylindrical permanent magnet 12 which is mounted for rotation about its axis 14. Permanent magnet 12 has a north pole "N" and a south pole "S". The permanent magnet is positioned between a pair of ends 16, 18 of a core 20 made of a soft magnetic material such as steel. Shutter blade 11 is maintained (rotation is prevented) in a rest state (covering aperture 10), by magnetic flux 22 coupling permanent magnet 12 to core ends 16, 18.

Referring to FIG. 2, electromagnetic actuator 8 includes an electrically conductive coil 24 which is wrapped about a portion of core 20. When electrical current is applied to coil 24, ends 16, 18 of core 20 become magnetic poles, respectively "N" and "S". These magnetic poles repel like poles on permanent magnet 12 and attract unlike magnet poles on the permanent magnet, thereby causing permanent magnet 12 and shutter blade 11 to rotate clockwise (in the direction of an arrow 25). The time it takes for shutter blade 11 to uncover aperture 10 depends on many factors. One such factor is the efficiency of the magnetic circuit (which includes permanent magnet 12, core 20 and coil 24), most notably a cross sectional area (thickness) "T" of core 20. A core with a relatively large cross-section "T" allows more electromagnetic flux to flow through the core, causing shutter 11 to open more rapidly than would occur with a core having a relatively small cross-section.

Turning to FIG. 3, when the current to coil 24 is turned off, shutter 11 is driven towards a closed position covering camera aperture 10 by the same magnetic flux 22 that holds permanent magnet 12 in the rest state (described above). There is also a magnetic flux component 26 that biases shutter 11 towards an open position. The proportion of the total magnetic flux that biases the shutter towards an open position also depends on the efficiency of the magnetic circuit, most notably the cross-sectional area (thickness) of the core. A core 20 with a relatively large cross sectional area "T" has a large proportion of magnetic flux 26 biasing shutter 11 towards an open position, thereby increasing the close time of the shutter. A core 20 with a relatively small cross sectional area "T" has only a small portion of the magnetic flux biasing shutter 11 towards an open position, thus decreasing the close time of the shutter. Thus, there is a trade-off between the time it takes to open the shutter and the time it takes to close the shutter.

The shutter open time is typically controlled by the camera electronics, which control the electrical drive time of coil 24. Often, the electrical drive time of the coil is programmed into the control electronics through software or hardware (application specific integrated circuit) and is not changeable from camera to camera as the cameras are manufactured. With a constant drive time, shutter open time may change appreciably from camera to camera due to part tolerances and magnet variation. Clearly such variation in shutter open time is a problem from a quality point of view. Further, prior art electromagnetic actuators for shutters require a different controller to be used for each of several camera models which have different shutter open times.

SUMMARY OF THE INVENTION

The present invention is directed to overcoming one or more of the problems set forth above. Briefly summarized, according to one aspect of the present invention, a core made of a soft magnetic material for use in an electromagnetic actuator having an actuation-related parameter includes means for adjusting the reluctance of the core to alter the actuation related parameter of the electromagnetic actuator.

According to another aspect of the invention, an electromagnetic actuator having an actuation-related parameter includes a core made of a soft magnetic material, a permanent magnet located between a pair of ends of the core, means for supporting the permanent magnet for movement, and an electrically conductive coil wrapped about a portion of the core. The reluctance of the core is adjustable to alter the actuation related parameter of the electromagnetic actuator.

According to a further aspect of the invention, a method of calibrating an electromagnetic actuator including a core made of a soft magnetic material, means for adjusting the reluctance of the core, a permanent magnet located between a pair of ends of the core, means for supporting the permanent magnet for movement, and an electrically conductive coil wrapped about a portion of the core, includes the steps of (a) adjusting the reluctance of the core via the adjusting means, (b) applying an electrical current to the coil to induce a magnetic field in the core (c) observing the movement of the permanent magnet in response to step (c) and (d) repeating steps (a) through (c) until a movement profile of the permanent magnet conforms to a desired movement profile.

By providing a core with an adjustable reluctance, an electromagnetic actuator which includes such a core can be precisely calibrated to achieve consistent actuator performance. Where the electromagnetic actuator is used to open and close a camera shutter, the shutter open time can be adjusted at the camera level even in the case where the electrical drive time of the coil is fixed. Also, the subject invention allows the same camera controller to be used for multiple camera models that may have different shutter open times. These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
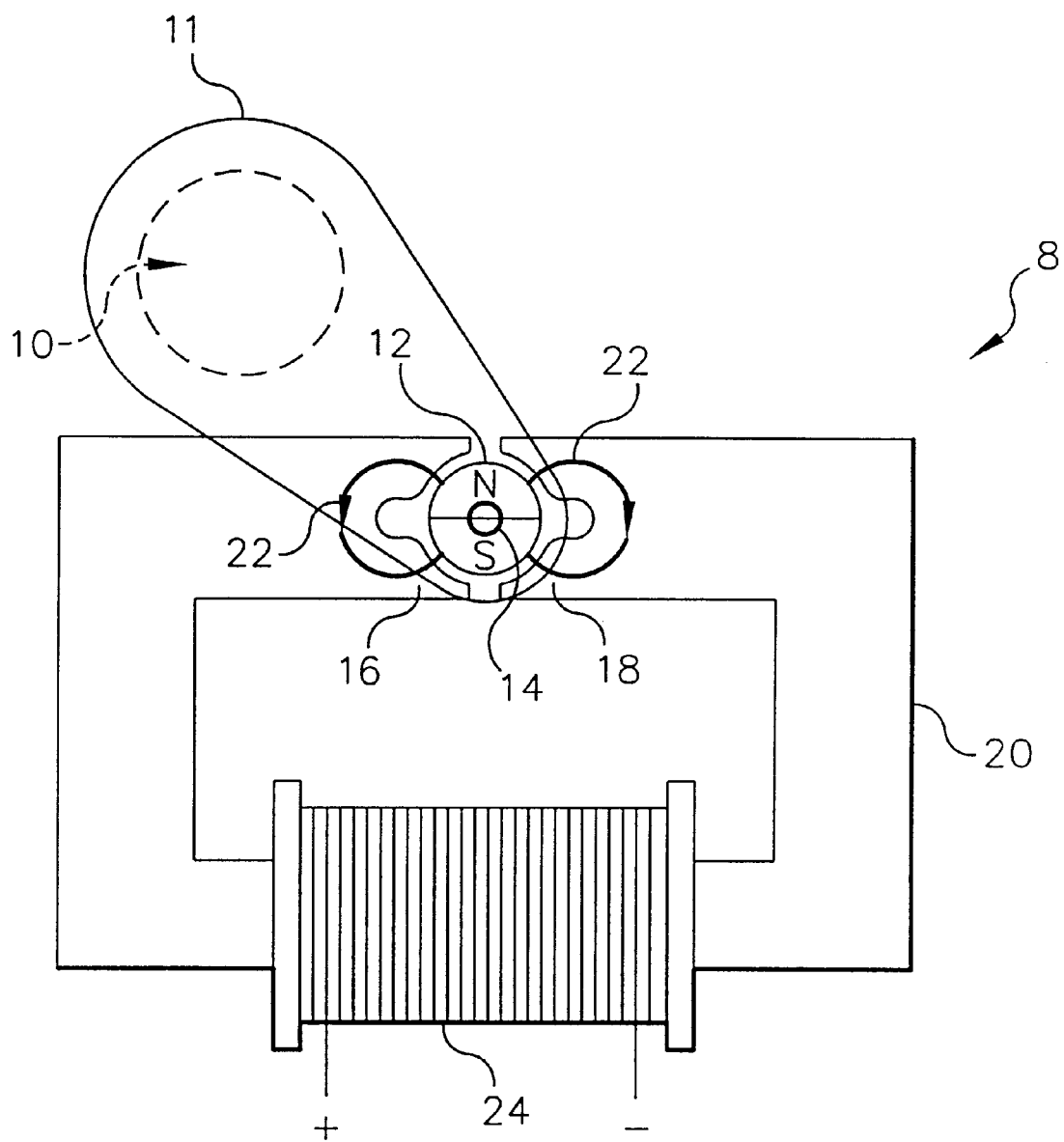
FIGS. 1–3 disclose a prior art electromagnetic actuator.
Figure 2:
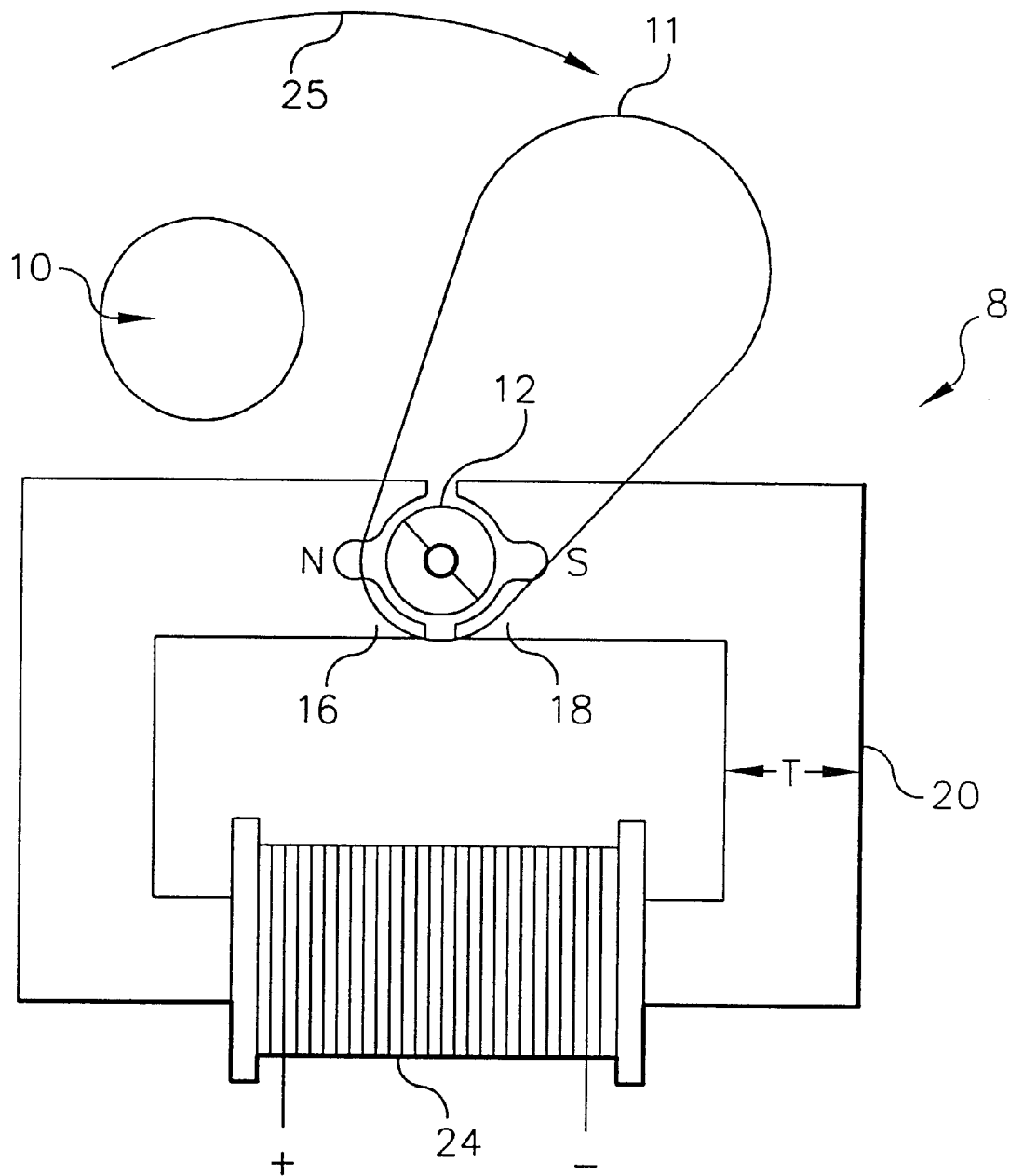
Figure 3:
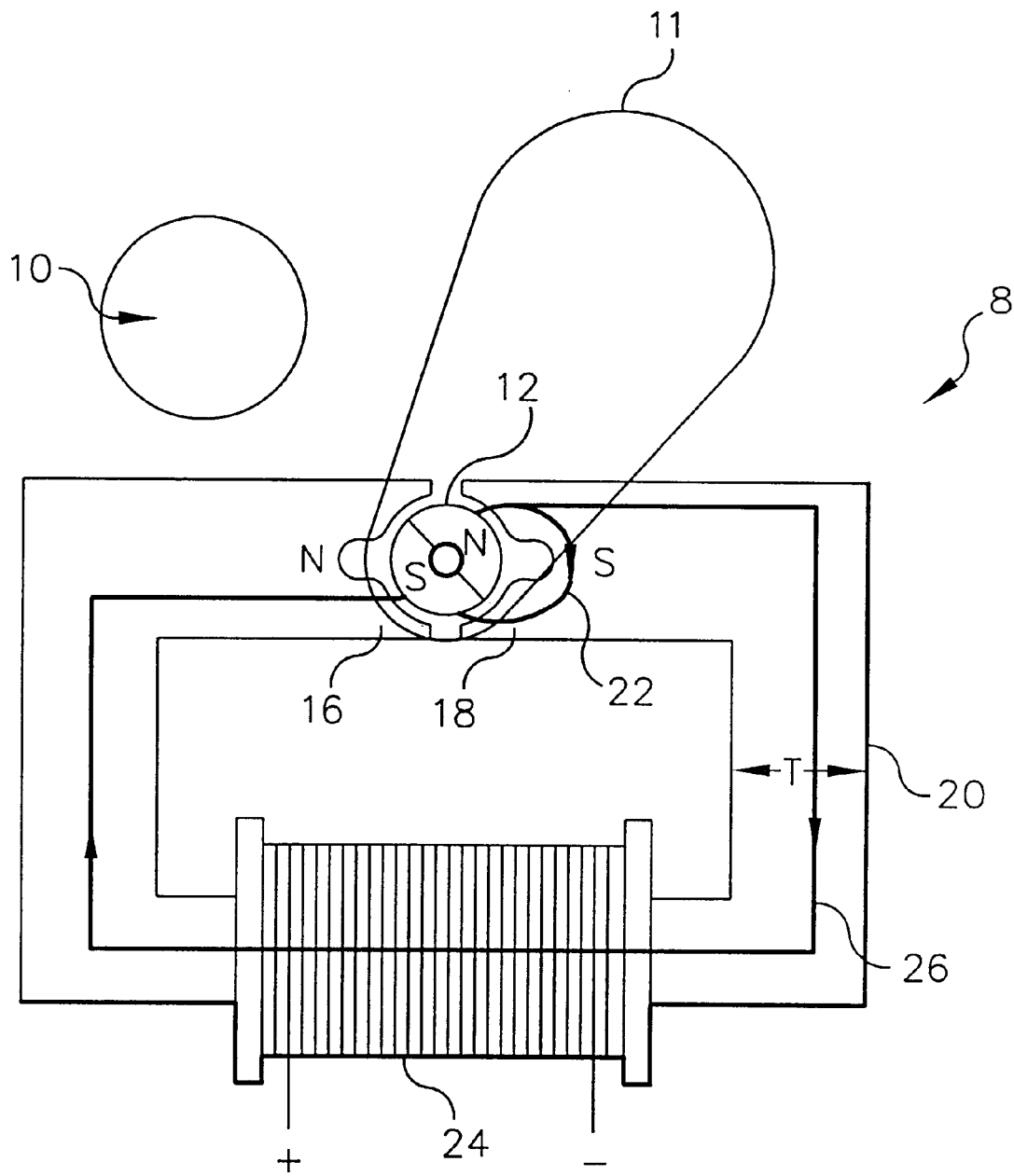
Figure 4:
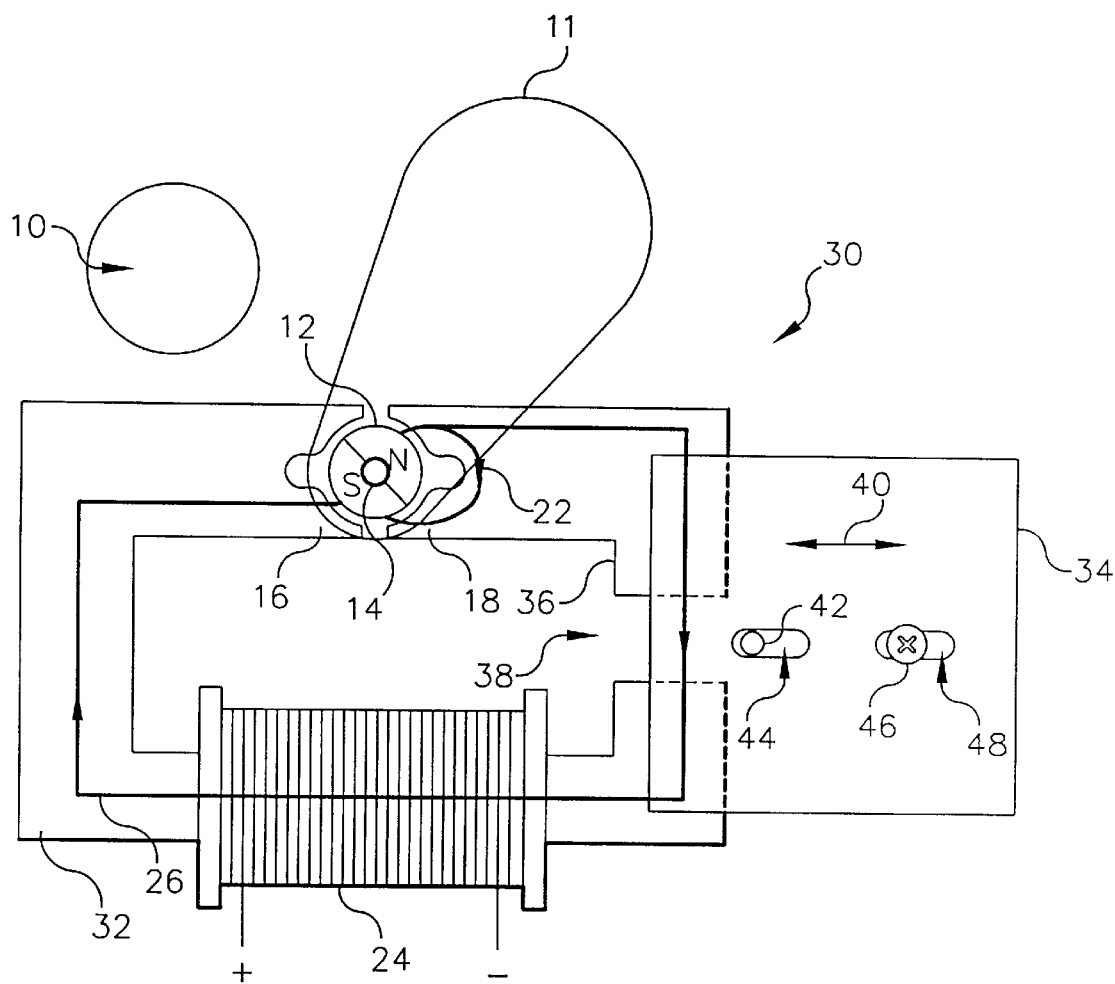
FIG. 4 shows an electromagnetic actuator for moving a shutter blade according to the invention.

Beginning with FIG. 4, an electromagnetic actuator 30 according to the invention is used to drive a shutter blade 11 between closed and open positions respectively covering and uncovering a camera aperture 10 (similar reference numerals are used for elements which are the same as in FIGS. 1–3). Shutter blade 11 is attached to a cylindrical permanent magnet 12 which is mounted for rotation about its axis 14. Permanent magnet 12 has a north pole "N" and a south pole "S". The permanent magnet is positioned between a pair of ends 16, 18 of a core 32 made of a soft magnetic material such as steel. An electrically conductive coil 24 is wrapped about a portion of core 32.

A plate (member) 34 made of a soft magnetic material is located adjacent a part 36 of the core about which coil 24 is not wrapped. Part 36 of core 32 has a gap 38 which is bridged by plate 34. Preferably, plate 34 is in contact with part 36 of core 32. Plate 34 is mounted for movement along the direction of a double headed arrow 40. A stationary guide pin 42 supported on a base (not shown) protrudes through a slot 44 in plate 34. A set screw 46 protrudes through a slot 48 in plate 34 into a threaded recess in the base. In order to move the plate along the direction of arrow 40, screw 46 is turned counter-clockwise to loosen the screw. Plate 34 is then either moved (a) in a first direction to increasingly overlap part 36 of core 32 to decrease the core reluctance (resistance to magnetic flux flow) or (b) in a second direction to decreasingly overlap part 36 of core 32 to increase the core reluctance. Once plate 34 is in the desired location, screw 46 is rotated clockwise to tighten the screw, thus pinning plate 34 in position.

Figure 5:
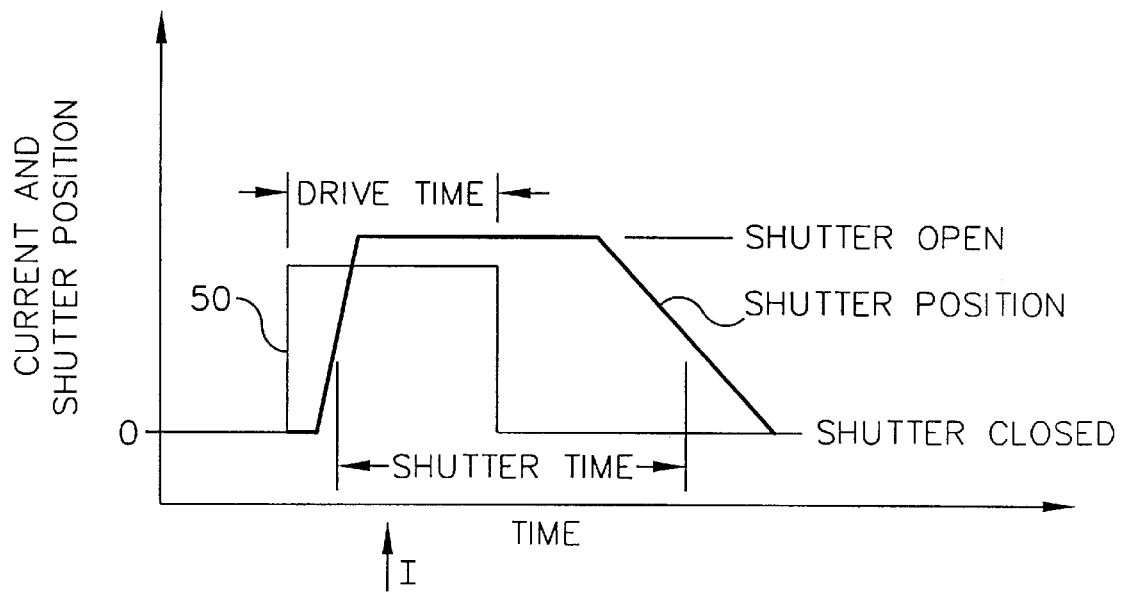
FIGS. 5 and 6 are graphs of drive coil current and shutter position versus time.

Turning to FIG. 5, once plate 34 is locked in position, an electrical current 50 is applied to drive coil 24 and the movement of shutter 11, thus permanent magnet 12, in response to the current is observed (a movement profile). Measurement of shutter movement can be accomplished by positioning a light emitter and light sensor on opposite sides of shutter blade 11, and plotting the electrical signal produced by the light sensor verses time during shutter actuation. FIG. 5 represents shutter movement verses time (an actuation related parameter) in a situation where plate 34 has been positioned to overlap a relatively large portion of part 36 of core 34. Notice that the time it takes for shutter 11 to move from a closed position to an open position is extremely short while the time it takes for the shutter to close is relatively long.

Figure 6:
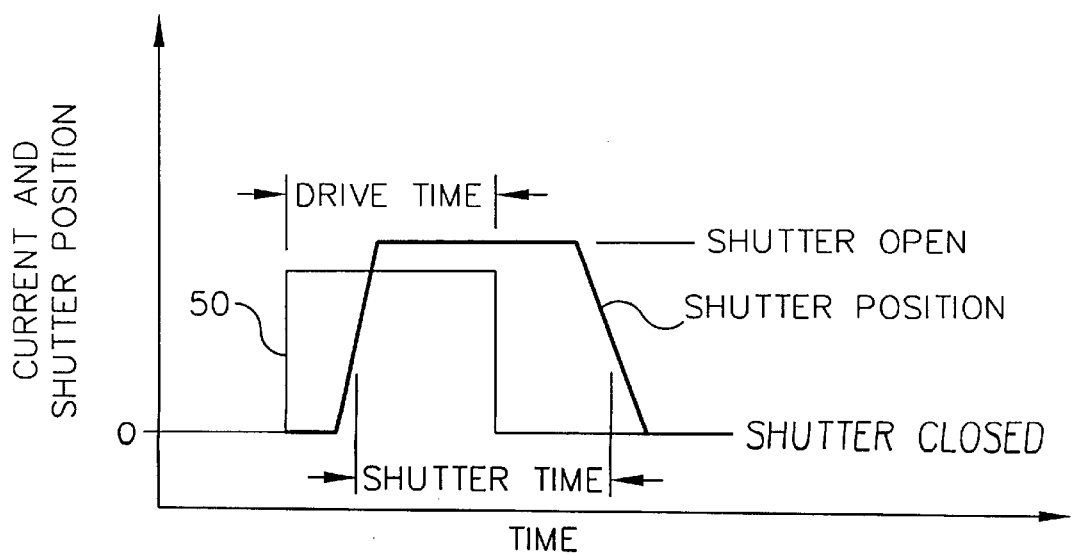

FIG. 6 represents a plot of drive current and shutter position versus time for a situation in which plate 34 has been positioned to overlap a relatively small portion of part 36 of core 34. Notice that the time it takes for shutter 11 to move from a closed position to an open position is relatively long compared to FIG. 5 while the time it takes for the shutter to close is relatively short compared to FIG. 5. The above process of adjusting core reluctance, applying current to coil 34 and observing shutter movement is repeated until a movement profile of the permanent magnet and shutter conforms to a desired movement profile. As such, consistent shutter movement profiles can be obtained from camera to camera in a manufacturing process.

Figure 7:
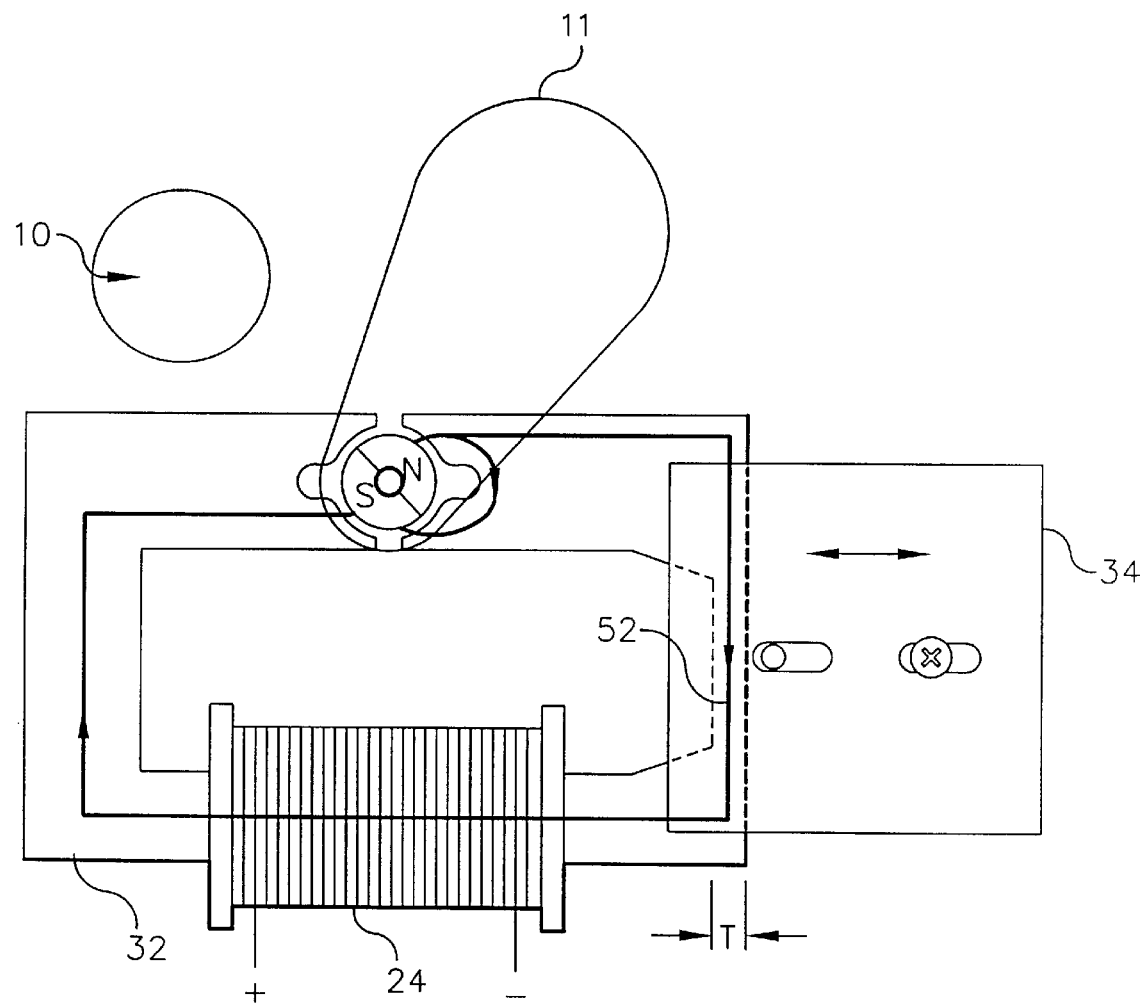
FIG. 7 shows an additional embodiment of the invention.

Turning to FIG. 7, an additional embodiment of the invention will be described. This embodiment is similar in all aspects to the embodiment in FIG. 4 except for one. The primary difference is that part 36 of core 32 in FIG. 4 has been replaced by part 52. Where part 36 has a gap in it, part 52 is an uninterrupted part of the core. Further, part 52 has a thinner cross-sectional thickness "T" than the remainder of core 32. Such a thinned out part 52 of core 32 allows plate 34 to be positioned as desired to adjust the reluctance of core 32 and thereby alter the shutter movement profile.

The invention has been described with reference to a preferred embodiment. However, it will be appreciated that variations and modifications can be effected by a person of ordinary skill in the art without departing from the scope of the invention.

We claim:

1. A shutter comprising an aperture and at least one shutter blade movable between an open and a closed position in which the aperture is uncovered and covered, respectively, and comprising an electromagnetic actuator having:

a core made of a soft magnetic material, the core having a cross sectional area;

a magnet located between a pair of ends of the core and connected to the at least one shutter blade so that movement of the magnet between a rest position and another position causes the at least one shutter blade to reversibly move between the two positions of the at least one shutter blade, the magnet being maintained in its rest position by magnetic flux coupling with the ends of the core, the magnet producing a weaker magnetic flux with the core biasing the magnet to its other position when in the other position;

means for supporting the magnet for movement between the rest position and the other position;

an electrically conductive coil wrapped about a first portion of the core to cause movement of the magnet from the rest position to the other position in response to an electrical current being applied to the coil, the magnet returning to its rest position when the current to the coil is turned off, the time for the magnet to move from its rest position to its other position being relatively short, and the time required to move from its other position to its rest position being relatively longer; and means for changing the cross sectional area of a second portion of the core to adjust the reluctance of the core and thereby to alter movement of the magnet from the rest position to the other position as a function of time upon application of electrical current to the coil of the electromagnetic actuator, and to alter movement of the magnet from the other position to the rest position as a function of time upon removal of the electrical current from the coil, the time of movement from the rest position to the other position being shortened and the time of movement from the other position to the rest position being lengthened when the cross sectional area is increased and vice versa, whereby the shutter time can be adjusted for a given current pulse applied to the coil.

2. The shutter of claim 1, wherein the means for changing includes a member made of a soft magnetic material which is located adjacent the second portion of the core, the member being movable in a first direction to increasingly overlap the second to decrease the core reluctance, and in a second direction to decreasingly overlap the second portion to increase the core reluctance.

3. The shutter of claim 2, wherein the member is in contact with the second portion.

4. The shutter of claim 2, wherein the second portion has a gap in it, and the member bridges the gap.

5. The shutter of claim 1, wherein the second portion is thinner than the remainder of the core.

6. A shutter according to claim 1 wherein the magnet is a permanent magnet.

7. A method of calibrating the response of an electromagnetic shutter actuator to a predetermined pulse of current, the electromagnetic shutter actuator including a core made of a soft magnetic material, the core having a cross sectional area, an electrically conductive coil wrapped about a first portion of the core, means for changing the cross sectional area of a second portion of the core to adjust the reluctance of the core, a magnet located between a pair of ends of the core, and means for supporting the magnet for movement from a rest position and another position in response to a current being applied to the coil, and for the magnet being maintained in its rest position by magnetic flux coupling with the ends of the core, the magnet producing a weaker magnetic flux with the core biasing the magnet to its other position when in the other position, comprising steps of:

(a) adjusting the reluctance of the core via the means for changing the time of movement from the rest position to the other position being shortened and the time of movement from the other position to the rest position being lengthened when the reluctance of the core is increased and vice versa;

(b) applying an electrical current to the coil for a predetermined pulse time to induce a magnetic field in the core to cause movement of the magnet from its rest position to the other position then stopping the electrical current to cause movement of the magnet to the rest position the time for the magnet to move from its rest position to its other position being relatively short, and the time required to move from its other position to its rest position being relatively longer;

(c) observing the distance moved by the magnet from the rest position to the other position then to the rest position, as a function of time in response to step (b); and (d) repeating steps (a) through (c) until a movement profile of the magnet conforms to a desired movement profile.

8. The method of claim 6, wherein the means for changing includes a member made of a soft magnetic material which is located adjacent the second portion of the core.

9. The method of claim 7, wherein step (a) adjusts the reluctance of the core by moving the member in a first direction to increasingly overlap the second portion to decrease the core reluctance, and in a second direction to decreasingly overlap the second portion to increase core reluctance.

10. The method of claim 7, wherein the member is in contact with the second portion.

11. The method of claim 7, wherein the second portion has a gap in it, and the member bridges the gap.

12. The method of claim 7, wherein the second portion is thinner than the remainder of the core.

13. A method according to claim 6 wherein the magnet is a permanent magnet.

\* \* \* \* \*